United States Patent [19]

Prosdocimi et al.

[11] Patent Number: 5,612,272
[45] Date of Patent: Mar. 18, 1997

[54] METHOD OF PRODUCING AN ACTIVE COMPOSITE

[75] Inventors: Jacques Prosdocimi, Canohes; Charles Timoney, L'Etang La Ville, both of France

[73] Assignee: Elf Aquitaine, France

[21] Appl. No.: 214,751

[22] Filed: Mar. 18, 1994

[30] Foreign Application Priority Data

Mar. 18, 1993 [FR] France .................................. 93 03145

[51] Int. Cl.⁶ .................................................. B01J 20/02
[52] U.S. Cl. .......................................... 502/181; 502/416
[58] Field of Search .................................. 502/1.82, 181, 502/416, 417

[56] References Cited

U.S. PATENT DOCUMENTS 2,069,294  1/1961  Shyne ...................................... 502/416

5,283,219  2/1994  Mauran ................................... 502/416

FOREIGN PATENT DOCUMENTS 0198186  10/1986  European Pat. Off. .
2284371   4/1976  France .
 679394   2/1992  Switzerland .
1194766   6/1970  United Kingdom .
WO91/15292 10/1991  WIPO .

Primary Examiner—Janyce Bell
Attorney, Agent, or Firm—Bacon & Thomas

[57] ABSTRACT

The invention relates to a method for producing an active composite consisting of a compressed support and an active agent. The compressed support comprises a porous support which is chemically inert and is a good thermal conductor, so as to allow complete and rapid interactions between the active agent, dispersed in the support, and a gas flow.

9 Claims, 5 Drawing Sheets

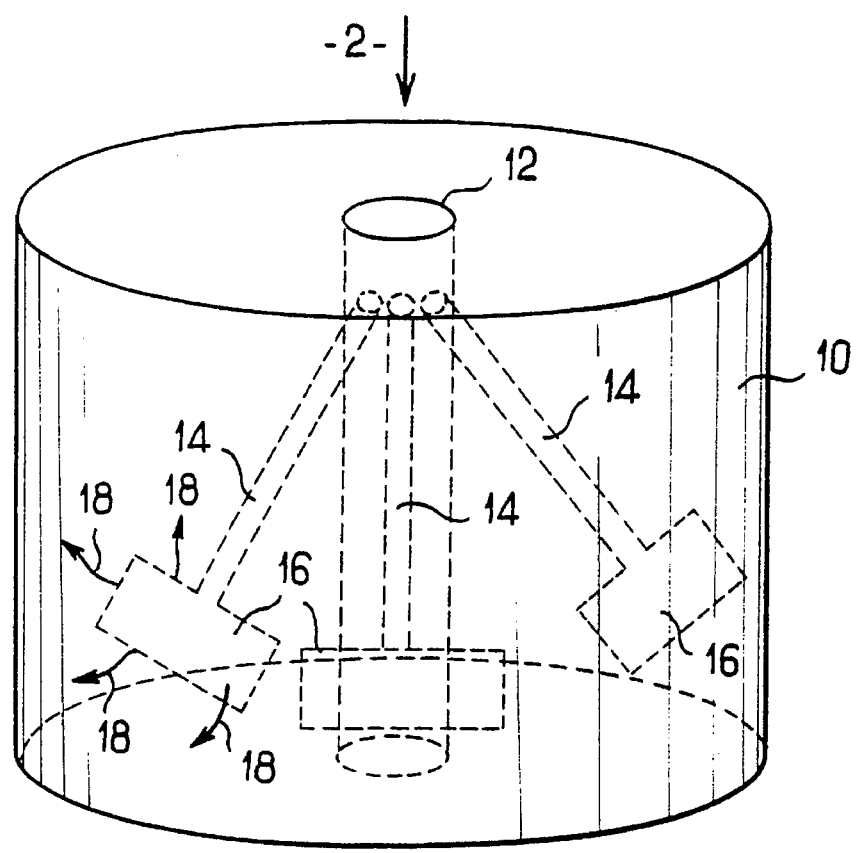
FIG_1
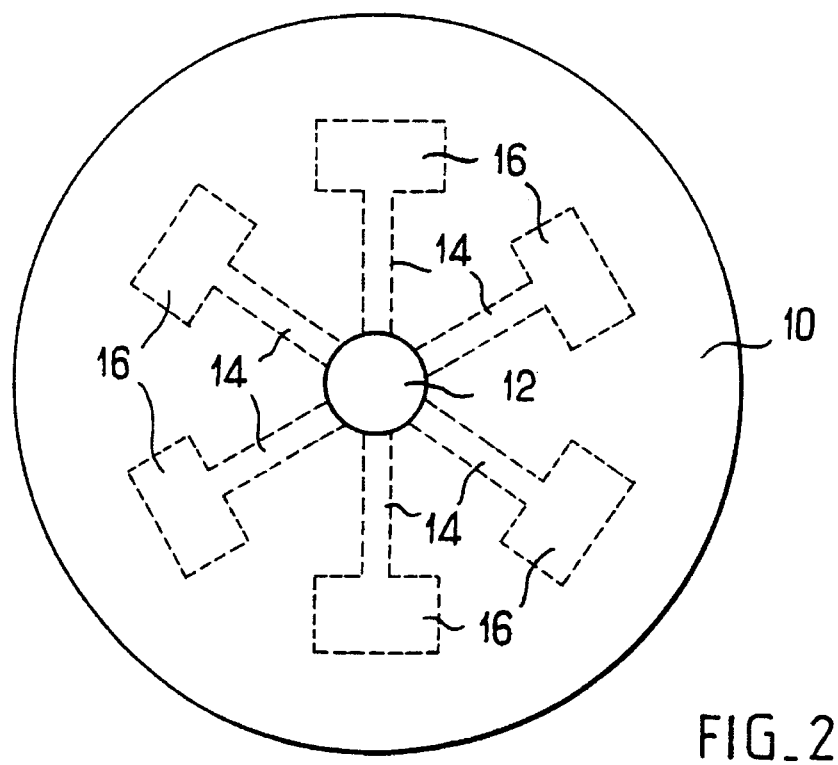
FIG_2

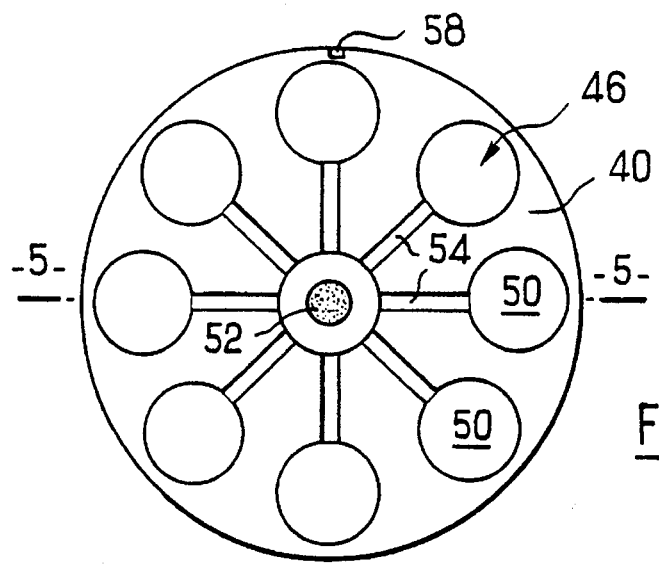
FIG._4
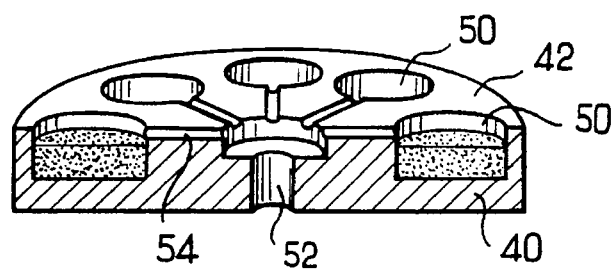
FIG._4A
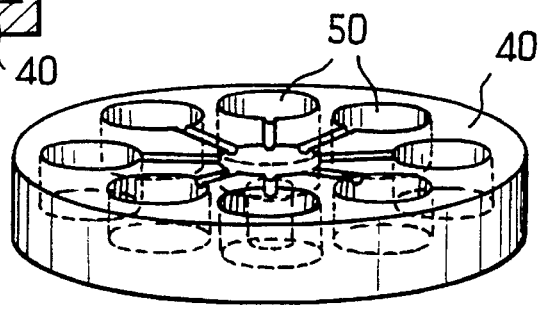
FIG._4B
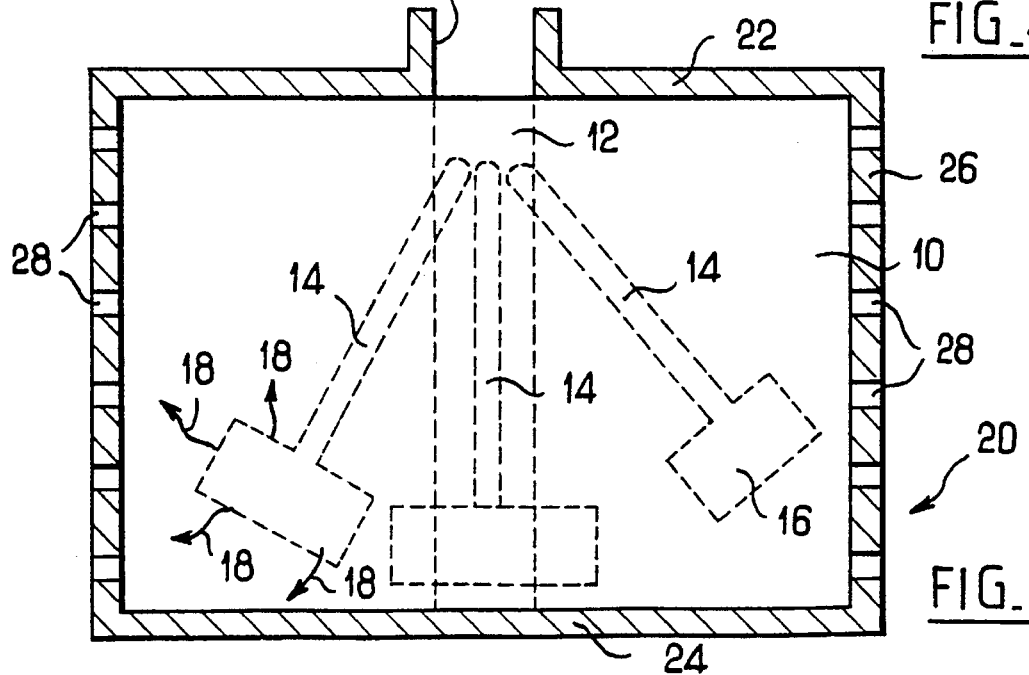
FIG._3

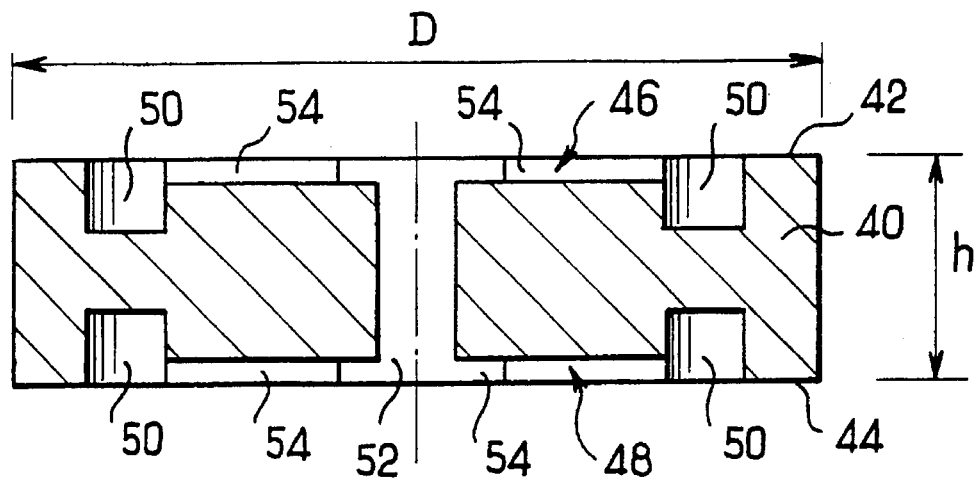
FIG_5
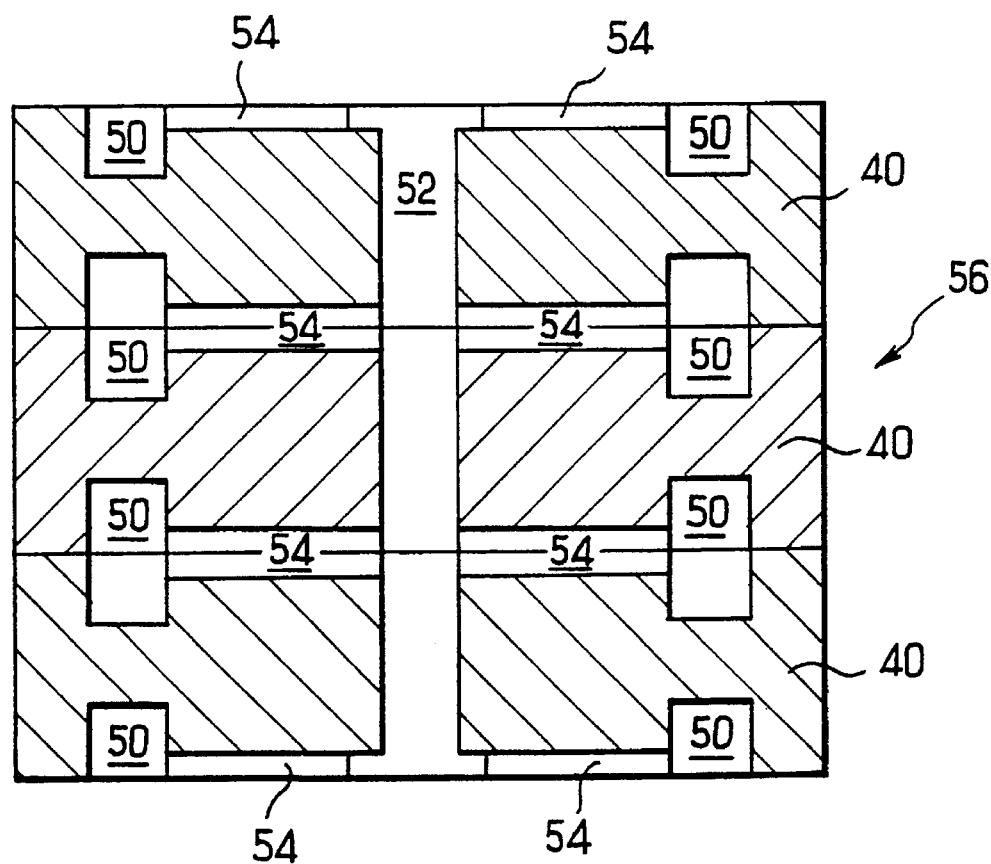
FIG_6

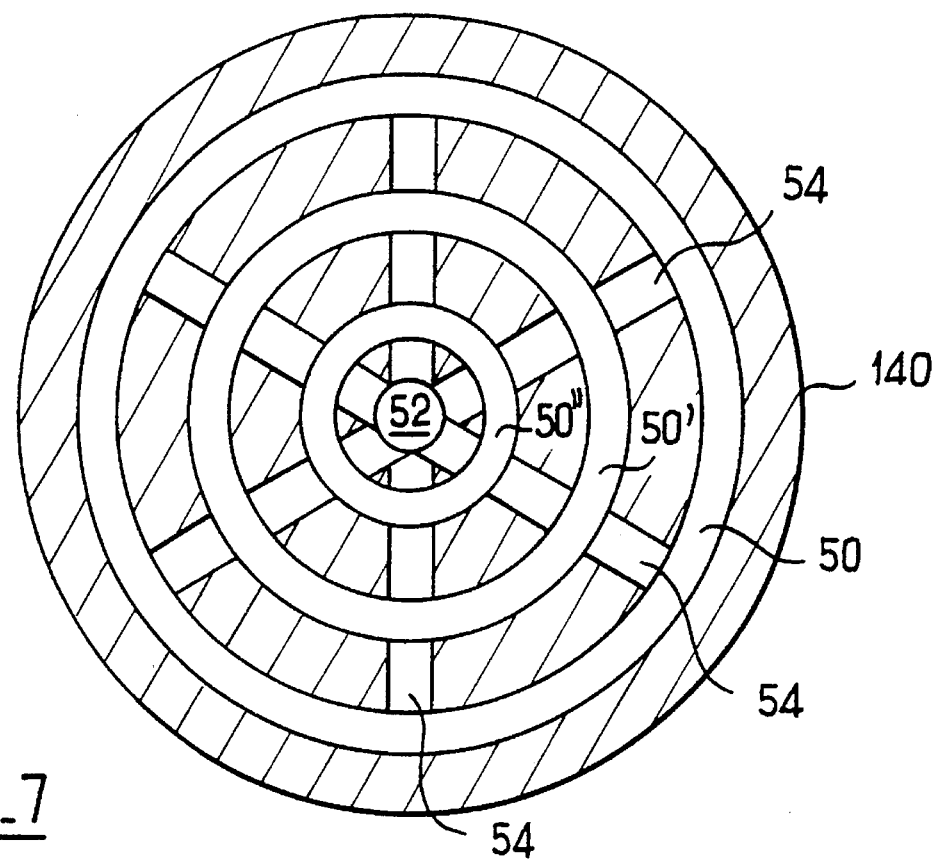
FIG_7
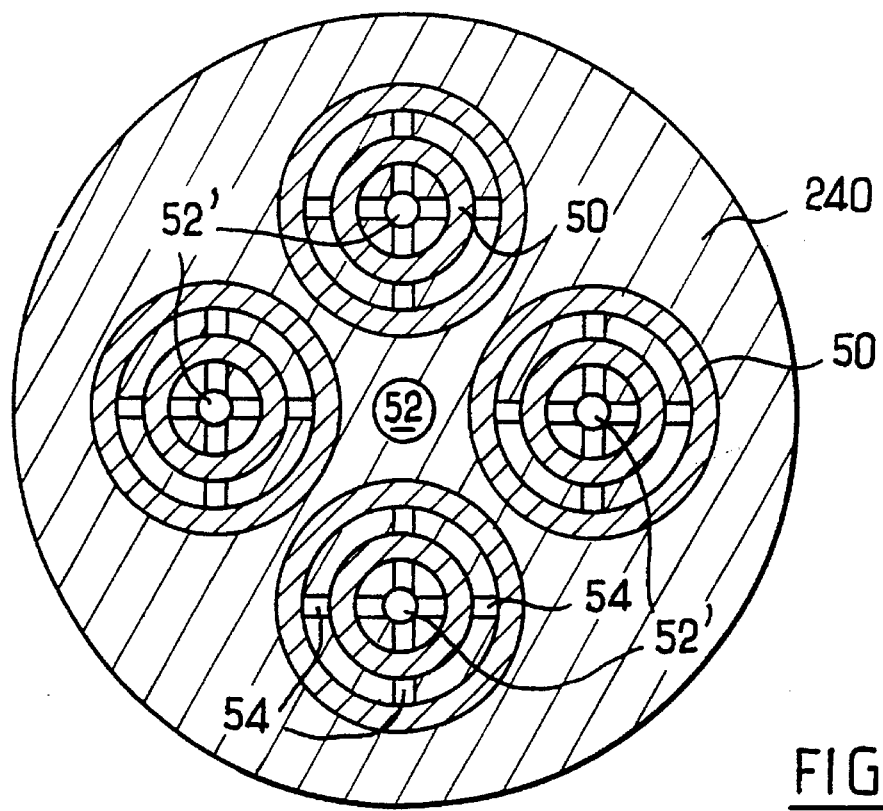
FIG_8

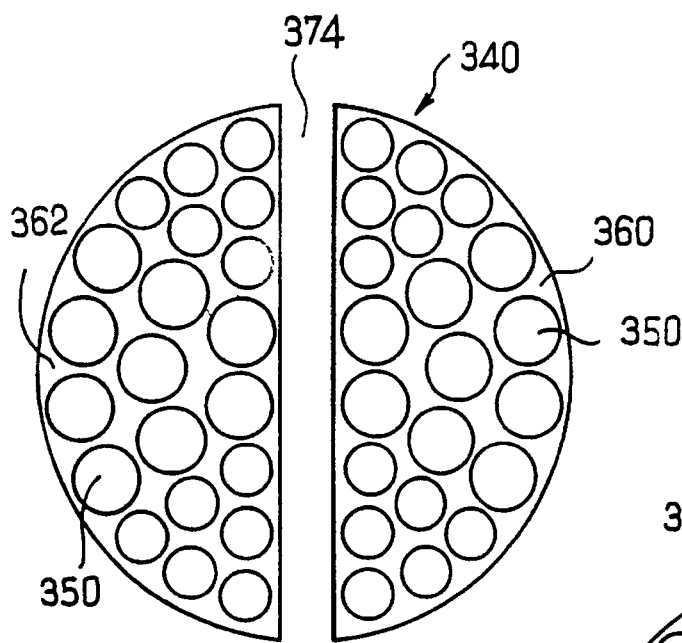
FIG_9
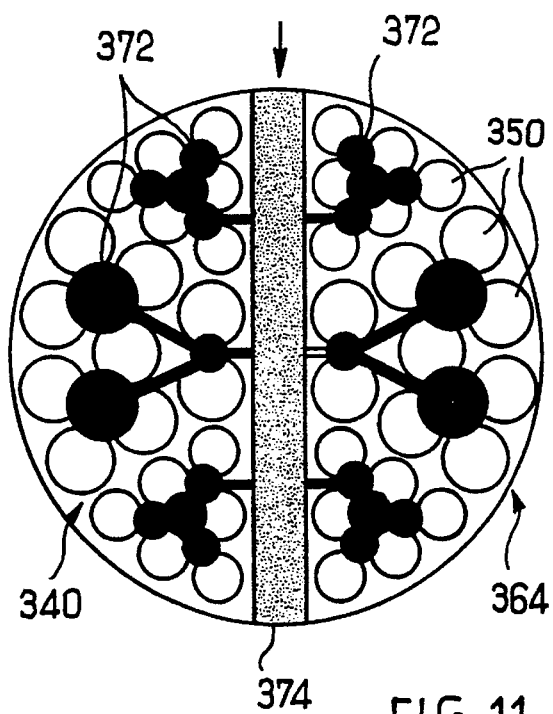
FIG_11
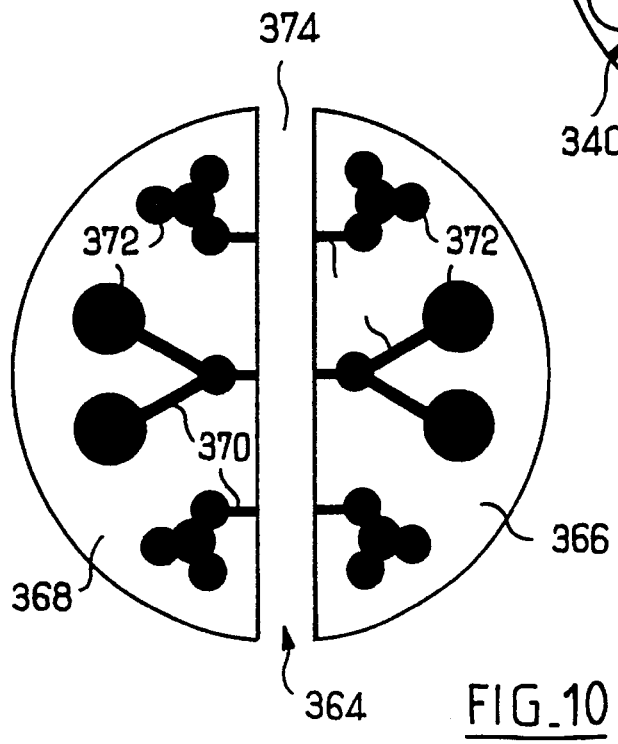
FIG_10

METHOD OF PRODUCING AN ACTIVE COMPOSITE

TECHNICAL FIELD OF THE INVENTION

The present invention relates to a method of producing an active composite consisting of a compressed support and an active agent. The compressed support constitutes a porous support which is chemically inert and is a good thermal conductor, so as to allow complete and rapid interactions between the active agent, dispersed in the support, and a gas flow.

In some fields, such as for example that of chemical heat pumps based on the heat of the reaction between a solid and a gas, or of the adsorption of a gas on a solid, a mixture of a divided material, such as expanded graphite, and a solid reactant, for example a salt, or alternatively an adsorbent such as a zeolite, is used. The mixture of expanded graphite and this solid, site of a chemical reaction or of a physical adsorption, had many advantages during a chemical reaction or a physical adsorption between the solid and a gas. Expanded graphite, being in the form of folia, has a very large specific surface area and allows diffusion of the gas even in a confined medium. In addition, the thermal conductivity of the mixture is high.

BACKGROUND OF THE INVENTION

In document WO 91/15292, it has been proposed to produce an active composite by preparing a support formed by a recompressed expanded graphite block which is subsequently impregnated from the outside, for example by a solution of a salt, the impregnated support being subsequently dried in order to produce the active composite. The active composite thus produced has a thermal conductivity markedly higher than that of expanded graphite in the form of folia, while at the same time maintaining a high porosity for gas flows.

Despite undeniable advantages, the active composite prepared according to the method described in document WO 91/15292 is not entirely satisfactory. The reason for this is, on the one hand, that the implementation of this method is lengthy and is difficult to be adapted to large-scale manufacture and, on the other hand, it is difficult to obtain a homogeneous distribution of the active agent within the support. In addition, the act of impregnating the recompressed expanded graphite block via the outside embrittles the outside wall of the block.

SUMMARY OF THE INVENTION

The subject of the present invention is therefore a method of producing an active composite allowing large-scale manufacture and in which the homogeneity of the distribution of the active agent in the support is improved.

The subject of the present invention is also such a method which enables an active composite having stronger outer walls to be produced.

In order to do this, the invention provides a method of producing an active composite, which includes the steps of:
formation of a porous support,
formation of at least one cavity in the porous support,
introduction into the porous support of an active agent brought into the cavity.

The invention also provides an active composite, consisting of a compressed support and an agent which is active with respect to a gas, produced by this method.

Such an active composite is intended to be used for implementing either a reaction of the solid/gas type, or an adsorption between a gas and a solid, or the absorption of a gas in a solution which may or may not be saturated with a solid, or a reaction between a gas and a liquid, which reaction is catalyzed by a solid, or, finally, the conversion reaction of a gas, catalyzed by a solid. Thus, the present invention provides a method for implementation either of reactions of the gas/solid type, or of gas/solid adsorption, or of absorption of a gas in a solution which may or may not be saturated with a solid, or, finally, catalytic conversion of a gas by using, as reactional medium, a block of graphite which is expanded and then recompressed using the method.

Other characteristics and advantages of the present invention will appear more clearly on reading the following description, made with reference to the appended drawings in place thereof:

DESCRIPTION OF THE DRAWINGS

FIG. 1 is a perspective diagrammatic view of an active composite in block form, according to a first embodiment of the invention;

FIG. 2 is a plan view taken in the direction of the arrow -2- of FIG. 1;

FIG. 3 is a sectional view of a chamber containing an active composite;

FIG. 4 is a plan view of an active composite in the form of an assembly element, according to a second embodiment;

FIGS. 4A and 4B are each a perspective diagrammatic view of the active composite of FIG. 4;

FIG. 5 is a section taken along the line 5—5 of FIG. 4;

FIG. 6 is a section of an assembly of a series of elements according to FIG. 5;

FIG. 7 is a plan view of an active composite in the form of an assembly element according to a third embodiment;

FIG. 8 is a plan view of an assembly element according to a fourth embodiment; and FIGS. 9, 10 and 11 are each a plan view of assembly elements according to another embodiment.

DETAILED DESCRIPTION OF THE INVENTION

FIG. 1 shows a compressed support 10 which, in the example illustrated, has a cylindrical shape. The compressed support 10 is formed by an expanded graphite, of initial density lying between 0.001 and 0.02, which is recompressed so as to obtain a support having a stable shape with a density between 0.02 and 1.5. An axial passage 12 extends through the support 10. In order to allow impregnation of the support 10 by means of an active agent, for example a salt, a series of substantially similar radial passages 14 are formed in the compressed support 10. As is seen in FIG. 2, the radial passages 14, being six in number in the example illustrated, extend in a symmetric manner into the compressed support 10.

A gallery 16 is formed at the end of each passage 14, remote from the axial passage 12. Each gallery is filled with salt in a pulverulent form. It is possible to use the active support thus produced in order to implement the solid/gas reactions. Alternatively, in order for the salt to penetrate into the compressed support, pressurized steam is sent via one end of the axial passage 12, the other end being closed off beforehand. The steam, while passing from the galleries 16 towards the outside of the compressed support 10, makes the salt penetrate into the interstices of the compressed support, as represented by the arrows 18 in FIG. 1. The symmetrical arrangement of the passages 14 and the galleries 16 ensures generally uniform diffusion of the salt into the compressed support. After stopping the steam, the compressed support is heated so as to dry it.

In an alternative embodiment, instead of filling the galleries 16 with pulverulent salt, a pressurized salt solution is injected via the axial passage 12. The compressed support is contained in a chamber 20, as shown in FIG. 3, so as to withstand the internal pressure generated by the pressurized solution. The chamber 20 comprises two closed ends 22, 24 of substantially circular shape which are connected via an annular wall 26 equipped with orifices 28 enabling the pressurized solution to leave. The end 22 of the chamber 20 includes an inlet 30 communicating with the axial passage 12 of the compressed support 10. The compressed support, impregnated with salt, forms an active composite.

The use of a compressed support 10, such as the one described hereinabove, enables the salt to be well distributed within the compressed support. The embodiments of the invention which are described hereinbelow also facilitate the preparation of active composite on a large scale.

The compressed support 10 described above has a height of the same order of magnitude as its diameter. In FIGS. 4 and 5 a compressed support 40 is shown, the height h of which is markedly less than the diameter D. As shown in FIGS. 4 and 5, the compressed support 40 includes cavities 46 and 48 on its two plane surfaces 42 and 44. In the example illustrated, the cavities 46, 48 are similar, symmetrical and each consist of six partial housings 50 connected to an axial passage 52 via conduits 54.

An alternative embodiment of the compressed support 40 is shown in FIG. 4A. In this example, the cavities 50 are arranged only on one surface 42 of the compressed support 40. As shown in FIG. 4B, the cavities 50 may, in another embodiment, extend through the compressed support 40 so as to form continuous passages in an assembly of compressed supports, such as the one shown in FIG. 6.

In a preferred embodiment, the recompression of the expanded graphite is performed in a piston/cylinder assembly in which the lower face of the piston as well as the bottom of the cylinder include projections so as to create cavities 46 and 48 during the recompression of the compressed support. The axial passage 52 is advantageously pierced afterwards.

FIG. 6 shows an assembly 56 of compressed supports 40 arranged on top of each other so that the partial housings 50 are aligned so as to form cavities. Preferably, each support 40 includes a notch 58 in order to allow correct alignment of the supports 40 with respect to each other. In the example illustrated, the assembly 56 includes three compressed supports 40. However, the assembly 56 may include any number greater than two.

The introduction of the active agent into the assembly 56 of compressed supports 40 so as to form an active composite may be carried out in various ways.

In a first embodiment, partial housings 50 on the upper surface of each compressed support 40 are filled beforehand with an active agent, for example a salt in the form of a fine powder. Compressed supports 40 are subsequently superimposed on each other so as to form an assembly 56, such as shown in FIG. 6. Pressurized steam is sent via the axial passage 52, which is in communication with the conduits 54, thus causing the diffusion of the salt into the material of the compressed supports 40. The assembly 56 of the supports 40 is finally dried.

However, this means of diffusion, due to the effect of the steam, cannot be used with every salt, given their very low vapour pressure.

According to a second embodiment, the introduction of the active agent into the assembly 56 of the compressed supports 40 consists in injecting a salt solution via one end of the axial passage 52, the other being closed beforehand. In order for the assembly 56 to withstand the internal pressure generated by the solution, it should be contained in a chamber similar to that 20 of FIG. 3. The assembly 56 of the compressed supports 40 is subsequently dried, as in the previous assembly.

A vacuum may advantageously be created inside the chamber 20 so as to facilitate the impregnation of the assembly.

According to a third embodiment of the impregnation, the axial passage 52, as well as the conduits 54 and the cavities 50, are filled with a solution of a salt at ambient pressure, the assembly 56 being contained in a chamber 20. Subsequently, the chamber 20 and the assembly 56 are rotated about the longitudinal axis of the axial passage 52. Due to the action of the rotation, the solution is subjected to a centrifugal force which causes the diffusion of the solution into the material of the assembly 56 from the cavities 50. Each compressed support 140 may comprise several coaxial circular housings 50, 50', 50'', such as shown in FIG. 7, so as to ensure better diffusion of the solution. The cross-section of the housings 50, 50', 50'' may vary from one housing to another.

According to another embodiment, the salt is mixed beforehand with a sublimable dispersant solid before its introduction into the cavities 50 of the assembly 56. The sublimable dispersant solid passes from a solid phase to a gas phase due to the effect of heat. This sublimation leads to the diffusion of the salt, which is in the form of a fine powder, into the material of the assembly 56. Since the recompressed expanded graphite is a very good thermal conductor, it is possible to heat the assembly 56 of the supports 40 from the outside so as to cause the sublimation of the dispersant. Alternatively, it is possible to send hot air via the axial passage 52 and the conduits 54 so as to ensure sublimation of the dispersant solid.

It is also possible to melt the active agent placed in the cavities by heating the compressed support or the assembly of compressed supports, from the outside. The molten agent penetrates into the material of the compressed support and the cooling of the compressed support leads to the thermocrystallization of the active agent.

FIG. 8 shows an alternative embodiment of a compressed support 240 intended to form an element of an assembly 56. This support 240 includes an axial passage 52, as well as other longitudinal passages 52', four in the example illustrated, each communicating with coaxial circular housings 50 via conduits 54.

FIGS. 9, 10 and 11 show an embodiment in which the cavities intended to contain the active agent, as well as the conduit, are arranged in different compressed supports.

As shown in FIG. 9, the compressed support 340 is formed from two parts 360 and 362 each having a generally semicircular cross-section and each is equipped with numerous cavities 350. In the example illustrated, each cavity 350 has a generally circular cross-section. FIG. 10 shows a compressed support 364 formed, like the one in FIG. 9, from two parts 366 and 368 which are generally semicircular and equipped with conduits 370 leading to openings 372. The superposition of the compressed supports 364 and 340 is shown in FIG. 11 and it may be seen that the openings 372 are each arranged so as to be able to communicate with several cavities 350. An assembly of compressed supports is formed from several pairs of supports 340 and 364.

In this embodiment, the cavities 350 are filled with active agent before the superposition of the compressed supports 340 and 364 and the assembly thus formed is used to implement solid/gas reactions without making the active agent penetrate into the material of the compressed supports unduly. This technique may be applied to the embodiments described hereinabove. Alternatively, in order to reduce the number of cavities 350, the active agent may be made to penetrate into the material of the compressed supports via one of the means described hereinabove.

In the embodiment of FIGS. 9 to 11, the reaction gas is introduced via the passage 374 between the two parts 360 and 362, and 366 and 368, of the compressed supports.

The method of producing an active composite according to the invention can be used with many active agents other than those provided by way of example in Table I. By active agent is meant, for example, a reactive solid, an absorbent solid, an absorbent liquid which may or may not be saturated, or a solid acting as catalyst.

TABLE I

| Nature of the active-agent/ gas interaction | Active agents | Gases |
| --- | --- | --- |
| (Reversible) solid/gas reactions | halides pseudohalides carbonates sulphates nitrates | water $NH_3$ and derivatives |
| | oxides | $CO_2$ $SO_2$ $SO_3$ |
| | metals | $O_2$ |
| | metal alloys | $H_2$ hydrocarbons |
| | metal hydrides | $H_2$ |
| (Reversible) liquid/gas absorption and (reversible) saturated-liquid/ gas absorption | aqueous solutions of halides pseudohalides carbonates sulphates nitrates, solutions in liq. $NH_3$ of halides pseudohalides carbonates sulphates nitrates | water $NH_3$ and derivatives |
| (Reversible) solid/gas adsorption | zeolite active carbon silica gel phosphoric oxide | water methanol and derivatives |
| Heterogeneous catalysis | $Ni + C_6H_6$ | $H_2$ |

In the case of chlorides, Table II specifies the nature of the impregnation liquids dissolving the active agent or putting it into suspension.

TABLE II

| | Impregnation liquid | |
| --- | --- | --- |
| Active agent | Dissolving agent | Suspending agent |
| $CaCl_2$ | water or alcohol, acetone | |
| $MnCl_2$ | alcohol | ether, liquid $NH_3$ |
| $BaCl_2$ | alcohol | |
| $NiCl_2$ | alcohol, $NH_4OH$ | liquid $NH_3$ |
| $CuCl_2$ | acetone | |
| $CoCl_2$ | alcohol, acetone ether | |
| $SrCl_2$ | alcohol, acetone | liquid $NH_3$ |
| NaCl | glycerine | |
| $FeCl_2$ | alcohol, acetone | |
| $NH_4Cl$ | alcohol, liquid $NH_3$ | acetone, ether |
| $CdCl_2$ | alcohol | acetone, ether |

Other reactions are possible between salts of Table II, either with methylamine or with ammonia.

The active composite produced according to the method which forms the subject of the invention may be used in any method for implementing a physico-chemical process employing a gas and either a reactive solid, or an adsorbent solid, or an absorbent liquid which may or may not be saturated, or a solid acting as catalyst, or, finally, the site of a condensation/evaporation of a gas.

The compressed support of the active composite produced according to the present method may comprise from 1 to 95% by weight of recompressed expanded graphite and from 99 to 5% by weight of active agent.

The method of producing an active composite according to the invention makes it possible to arrange more active agent towards the inside of the composite and less towards its outside. Thus, the invention enables an active composite to be produced whose outer walls are more solid.

We claim:

1. A method for producing an active composite, which comprises the steps of forming at least two porous supports by the compression of expanded pulverulent product;

forming at least one cavity extending into each porous support;

forming an assembly of said supports; and introducing into each porous support an active agent brought into the cavity.

2. Method according to claim 1, wherein, in order to form the cavity, each support is formed with a partial housing, the supports being arranged in such a way that two partial housings are in correspondence and together form the cavity.

3. Method according to claim 2, wherein the assembly of supports is formed from a series of porous supports which are substantially similar to each other.

4. Method according to claim 1, wherein the introduction into the porous support of active agent is performed by inserting the active agent into the cavity and by dispersing the active agent into the support by injecting steam into the cavity.

5. Method according to claim 1, wherein, in order to introduce the active agent into the porous support, a solution of the active agent is prepared and this solution is subsequently injected into the cavity, the method further including a step of drying the impregnated porous support.

6. Method according to claim 1, wherein, in order to introduce the active agent into the porous support, a solution of the active agent is prepared and is inserted into the cavity, the porous support is rotated so as to cause the solution to penetrate into the porous support and the impregnated porous support is dried.

7. Method according to claim 1, wherein, in order to introduce the active agent into the porous support, a mixture of an active agent and sublimable dispersant is inserted into the cavity, the dispersant causing the active agent to penetrate into the porous support due to the effect of heat.

8. An active composite comprising an assembly of at least two porous supports of compressed expanded pulverulent material having at least one cavity therein and an active agent introduced into said porous supports through said at least one cavity.

9. The active composite of claim 8, wherein the compressed support comprises from 1 to 95% by weight of recompressed expanded graphite having a density between 0.02 and 1.1 and from 99 to 5% by weight of active agent.

* * * * *